(12) United States Patent
Sakatani et al.

(10) Patent No.: US 6,645,460 B2
(45) Date of Patent: Nov. 11, 2003

(54) TITANIUM HYDROXIDE AND PHOTOCATALYTIC COATING AGENT

(75) Inventors: Yoshiaki Sakatani, Niihama (JP); Hironobu Koike, Niihama (JP); Hiroyuki Ando, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 288 days.

(21) Appl. No.: 09/820,363

(22) Filed: Mar. 29, 2001

(65) Prior Publication Data

US 2001/0056037 A1 Dec. 27, 2001

(30) Foreign Application Priority Data

May 24, 2000 (JP) ........................................ 2000-152556

(51) Int. Cl.⁷ .............................................. C01G 25/02
(52) U.S. Cl. ...................... 423/608; 502/350; 423/610; 423/384
(58) Field of Search ................................ 423/384, 608, 423/610; 502/350

(56) References Cited

U.S. PATENT DOCUMENTS

| 4,021,533 A | * | 5/1977 | Piccolo et al. .............. 423/610 |
| 4,705,770 A | * | 11/1987 | Cullo et al. ................ 502/242 |
| 5,011,674 A | | 4/1991 | Yoshimoto et al. |
| 5,929,307 A | | 7/1999 | Hodges et al. |
| 5,962,255 A | | 10/1999 | Griffiths et al. |
| 6,231,981 B1 | * | 5/2001 | Hareyama ................... 428/403 |
| 6,511,642 B1 | * | 1/2003 | Hatanaka et al. ......... 423/239.1 |

FOREIGN PATENT DOCUMENTS

| EP | 0 542 466 A2 | 5/1993 |
| EP | 1 065 169 A1 | 1/2001 |
| EP | 1 095 908 A1 | 5/2001 |
| EP | 1 125 636 A1 | 8/2001 |
| EP | 1 254 863 | 11/2002 |
| GB | 427339 | 4/1935 |
| WO | 98/43733 | 10/1998 |
| WO | WO 9940028 A1 | * 8/1999 ............ B32B/5/16 |

OTHER PUBLICATIONS

Database WPI, Section Ch, Week 198132, Derwent Publications Ltd., London, GB, corresponding to SU 783 234 A, published Nov. 30, 1980.
Database WPI, Section Ch, Week 199721, Derwent Publications Ltd., London, GB, corresponding to JP 09–071418 A, published Mar. 18, 1997.
Database WPI, Section Ch, Week 199037, Derwent Publications Ltd., London, GB, corresponding to JP 02–196028 A, published Aug. 2, 1990.
Shinri Sato, "Photocatalytic Activity of $NO_x$–Doped $TiO_2$ In The Visible Light Region", *Chemical Physics Letters*, vol. 123, No. 1,2, Jan. 3, 1986, pp. 126–128.
Hochuli, E., et al., "Genetic Approach to Facilitate Purification of Recombinant Proteins with a Novel Metal Chelate Adsorbent," *Bio/technology* 6:1321–1325, Nature Publishing Co. (Nov. 1988).
Krautwald, S. and Baccarini, M., "Bacterially Expressed Murine CSF–1 Processes Agonistic Activity in its Monomeric Form," *Biochemical and Biophysical Research Communications* 192:720–727, Academic Press, Inc. (Apr. 30, 1993).
The Chemical Society of Japan, No. 8 (1986), pp. 1084–1090 no month.

* cited by examiner

*Primary Examiner*—Stanley S. Silverman
*Assistant Examiner*—Edward M. Johnson
(74) *Attorney, Agent, or Firm*—Sughrue Mion, PLLC

(57) ABSTRACT

There is provided a titanium hydroxide having a nitrogen content of 2.3% by weight or more in terms of nitrogen atom based on the titanium hydroxide and/or having a nitrogen content of about 3.3% by weight or more in terms of nitrogen atom based on the titanium oxide obtained after calcining the titanium hydroxide in air at about 400° C. The titanium hydroxide may be utilized as a raw material for producing a photocatalyst which exhibits a superior photocatalytic activity by irradiation of visible light.

6 Claims, No Drawings

TITANIUM HYDROXIDE AND PHOTOCATALYTIC COATING AGENT

FIELD OF THE INVENTION

The present invention relates to a titanium hydroxide, a photocatalyst produced from the titanium hydroxide and a photocatalytic coating agent. Specifically, a titanium hydroxide that may be utilized as a raw material for producing a photocatalyst which exhibits a superior photocatalytic activity by irradiation of visible light, a photocatalyst produced from the titanium hydroxide and a photocatalytic coating agent comprising the titanium hydroxide.

BACKGROUND OF THE INVENTION

It has been researched that organic materials in water or NOx in air is decomposed and removed by a photocatalytic activity of photocatalyst such as a specific titanium oxide. In these days, it has been attracting an attention of researchers to decompose and remove such things using visible light as a light source in the point of general purpose and usage and it has been desired to develop a photocatalyst which exhibits a superior photocatalytic activity by irradiation of visible light.

Heretofore, the photocatalyst has been produced by calcining a titanium hydroxide, which may be commercially available. However, there are problems such that the photocatalyst obtained by calcining the commercially available titanium hydroxide in a commonly used way does not show a sufficiently high photocatalytic activity by irradiation of visible light.

SUMMARY OBJECTS OF THE INVENTION

One of the objects of the present invention is to provide a titanium hydroxide, which may be utilized as a raw material for producing a photocatalyst which exhibits a sufficiently high photocatalytic activity by irradiation of visible light. Other objects of the present invention are to provide a photocatalyst produced from the titanium hydroxide and to provide a photocatalytic coating agent comprising the photocatalyst.

The present inventors have undertaken extensive studies on such a titanium hydroxide. As a result, the present inventors have found that a titanium hydroxide having a specific amount of nitrogen content may be utilized as the raw material for producing a photocatalyst which exhibits a sufficiently high photocatalytic activity by irradiation of visible light, and a photocatalytic coating agent as well as such a photocatalyst may be easily produced from the titanium hydroxide, thereby the present invention has been accomplished.

The present invention first provides a titanium hydroxide having a nitrogen content of 2.3% by weight or more in terms of nitrogen atom based on the titanium hydroxide and/or having a nitrogen content of about 3.3% by weight or more in terms of nitrogen atom based on the titanium oxide obtained after calcining the titanium hydroxide in air at about 400° C.

Secondly, the present invention provides a photocatalyst produced by calcining the above-described titanium hydroxide.

Thirdly, the present invention provides a photocatalytic coating agent comprising the above-described titanium hydroxide and a solvent.

DETAILED DESCRIPTION OF THE INVENTION

A titanium hydroxide of the present invention is represented by the chemical formula $Ti(OH)_2$, $Ti(OH)_3$, $Ti(OH)_4$ or $H_4TiO_4$ as a main component and contains a specific amount of nitrogen atom. The nitrogen atom is not an atom which can be washed away with water from the titanium hydroxide. The amount of the nitrogen atom may be measured as a nitrogen content in terms of nitrogen atom with an elemental analysis after washing the titanium hydroxide with water. The titanium hydroxide has a nitrogen content of 2.3% by weight or more, preferably 2.5% by weight or more, in terms of nitrogen atom based on the titanium hydroxide and/or has a nitrogen content of about 3.3% by weight or more, preferably about 3.5% by weight or more, in terms of nitrogen atom based on the titanium oxide obtained after calcining the titanium hydroxide in air at about 400° C. When the titanium hydroxide having a nitrogen content of less than the above described amount is calcined as it is, it is difficult to obtain a titanium oxide which exhibits a high photocatalytic activity by irradiation of visible light.

The upper limit of the nitrogen content of the titanium hydroxide is not limited, and may be 30% by weight or less in terms of nitrogen atom based on the titanium hydroxide and/or may by about 25% by weight or less in terms of nitrogen atom based on the titanium oxide obtained after calcining the titanium hydroxide in air at about 400° C.

The titanium hydroxide of the present invention may have (i) an X-ray photoelectron spectrum which has a peak at a binding energy within the range of from 458 eV to 460 eV and (ii) an index $X_1$ calculated by the equation below of about 0.76 or more, preferably about 0.8 or more, and more preferably 0.83 or more:

$$X_1 = B_1/A_1$$

wherein $A_1$ and $B_1$ stand for respective half-widths of peaks, which are obtained by the process consisting of the steps of:

(1) measuring an X-ray photoelectron spectrum of the titanium hydroxide eight times while irradiating X-ray, (2) obtaining a half-width, $A_1$, of peak at a binding energy within the range of from 458 eV to 460 eV with respect to the integrated spectrum obtained by integrating the first and second X-ray photoelectron spectra which have been measured in step (1), and (3) obtaining a half-width, $B_1$, of peak at a binding energy within the range of from 458 eV to 460 eV with respect to the integrated spectrum obtained by integrating the seventh and eighth X-ray photoelectron spectra which have been measured in step (1).

The peak at a binding energy within the range of from 458 eV to 460 eV in X-ray photoelectron spectrum shows an electron state of titanium.

In the present invention, the X-ray photoelectron spectra (hereinafter referred to as "XPS") of titanium hydroxide may be measured using an X-ray photoelectron spectrometer by carrying out a set of procedures (comprising 3 steps below) four times in total.

1st step: an XPS within the range of a binding energy of from 458 eV to 460 eV, which shows an electron state of titanium, is measured twice, provided that a period of time per analysis is 60 seconds, 2nd step: an XPS within a binding energy of from 526 eV to 535 eV, which shows an electron state of oxygen, is measured twice provided that a period of time per analysis is 56 seconds, 3nd step: an XPS within a binding energy of from 281 eV to 290 eV, which shows an electron state of carbon, is measured twice provided that a period of time per analysis is 80 seconds.

The above sets of procedures may be conducted so that a period of time required between the beginning of the 1st step in the first set and the completion of the 3rd step in the fourth set is within 30 minutes without exposing the titanium hydroxide in air. The XPS showing an electron state of carbon is used as a standard for determining a peak position in other XPS. The 1st step in the first set of the procedures provides the first and second XPS with respect to the electron state of titanium. Similarly, the 1st steps in the second and third sets of procedures provide the third, fourth, fifth and sixth XPS with respect to the electron state of titanium. Further, the 1st step in the fourth set of procedures provides the seventh and eighth XPS. A half-width of peak of the present invention is obtained from the peak in the spectrum obtained by integrating the two XPS, each showing the electron state of titanium, specifically from the peak of titanium at a binding energy within the range of from 458 eV to 460 eV. A half-width $A_1$ of peak is obtained from the peak in the integrated spectrum of the first and second XPS, and a half-width $B_1$ of peak is obtained from the peak in the integrated spectrum of the seventh and eighth XPS. The index $X_1$ of the present invention is calculated as a rate of the half-width $B_1$ to the half-width $A_1$, i.e. $B_1/A_1$. When two or more peaks are found within the binding energy range of from 458 eV to 460 eV, a half-width $A_1$ and/or $B_1$ is obtained from the highest peak among them.

It is preferred that the titanium hydroxide of the present invention has an amorphous phase. By calcining the titanium hydroxide having the amorphous phase, a photocatalyst which exhibits an excellent photocatalytic activity may be obtained. The crystal structure of titanium hydroxide may be measured in an X-ray diffraction method.

The titanium hydroxide of the present invention, which contains a specific amount of nitrogen atom, may be obtained in a process which comprises a step of adding an ammonia solution (ammonia water) or an ammonium compound into an aqueous solution of titanium compoud under cooling with ice while stirring to precipitate a solid, followed by washing with hot water and drying. Examples of the ammonium compound to be added include ammonium sulfate, ammonium chloride, ammonium carbonate, ammonium nitrate, ammonium phosphate and ammonium acetate. Examples of the titanium compoud include an inorganic titanium compound such as titanium trichloride, titanium tetrachloride, titanium tetrabromide, titanium sulfate and titanium oxysulfate.

The titanium hydroxide may be obtained after a mold processing. Examples of the shape of such a molded titanium hydroxide include particulate shape, fibrous shape, thin-layer shape and the like. The mold processing may be conducted in a method of dispersing a titanium hydroxide in a solvent such as water or an alcohol to obtain a slurry, applying the slurry onto an uneven surface of a plate such as a metal plate and drying the slurry. By such a method, a titanium oxide having a designated shape can be easily obtained. For example, when a fibrous-shaped titanium hydroxide is calcined, a fibrous-shaped titanium oxide is easily provided. When a thin-layer-shaped titanium hydroxide is calcined, a thin-layer-shaped titanium oxide is easily provided.

A photocatalytic coating agent in the present invention comprises a titanium hydroxide of the present invention, which contains a specific amount of nitrogen atom, and a solvent.

The photocatalytic coating agent makes it possible to apply the titanium hydroxide of the present invention onto a surface of material such as a metal, that has sufficiently high thermal resistance in calcining the titanium hydroxide, or to cover a surface of such a material with the titanium hydroxide, as well as to provide such a material with a high photocatalytic activity after calcination.

The solvent in the photocatalytic coating agent is not particularly limited. Preferred are those which evaporate easily in calcination after the applying or the covering, in other words, those which hardly remain on the resulting titanium oxide obtained after calcining the titanium hydroxide. Examples thereof include water, acids such as hydrochloric acid, bases such as ammonia, hydrogen peroxide, alcohols and ketones.

The photocatalytic coating agent may be produced in a process wherein the titanium hydroxide is dispersed in the above-described solvent to form a slurry or solution. When dispersing titanium hydroxide in the solvent, if desired, a dispersing agent may be used.

A photocatalyst in the present invention may be obtained by calcining the titanium hydroxide of the present invention, which contains a specific amount of nitrogen atom.

The temperature of the calcining of the titanium hydroxide is not limited, as long as a titanium hydroxide is transferred to a titanium oxide at the temperature. The temperature may be about 300° C. or higher, preferably about 350° C. or higher, and about 600° C. or lower, preferably about 500° C. or lower. When the temperature of calcination is too high, the photocatalytic activity of the photocatalyst obtained after calcination may decrease.

The photocatalyst in the present invention may be used in a method, for example, in which the photocatalyst and a material (to be treated with the photocatalyst) such as a material in a liquid state or in a gaseous state are placed in a glass vessel capable of transmitting visible light, and then are irradiated with visible light having a wavelength of 430 nm or longer using a light source. The light source is not particularly limited, as long as it irradiates light containing visible light having a wavelength of 430 nm or longer and/or ultraviolet light which is commonly used in a photocatalytic reaction. Examples of the light source include sunlight, a fluorescent lamp, a halogen lamp, a black light, a xenon lamp, a mercury lamp and the like. If desired, the light source may be equipped with an ultraviolet cut-off filter and/or an infrared cut-off filter.

An irradiation time with visible light is not particularly limited, and may be selected appropriately depending on a strength of light of a light source and a kind, amount and concentration of a material to be treated with the photocatalyst.

As described above, the titanium hydroxide of the present invention can be utilized as a raw material for producing a photocatalyst which exhibits a superior photocatalytic activity by irradiation of visible light. The photocatalyst produced from the titanium hydroxide can decompose a variety of organic materials such as carboxylic acids, for example, acetic acid. Also, the photocatalytic coating agent in the present invention makes it possible to easily apply the titanium hydroxide of the present invention onto a material such as a metal or a glass as well as to provide such a material with a high photocatalytic activity by calcination after the applying.

The titanium hydroxide, photocatalyst and photocatalytic coating agent of the present invention is described in Japanese application no. 2000-152556, filed on May 24, 2000, the complete disclosures of which are incorporated herein by reference.

The present invention is described in more detail by following Examples, which should not be construed as a limitation upon the scope of the present invention.

A crystal structure of titanium hydroxide or titanium oxide was obtained in an X-ray diffraction method using an X-ray diffractometer (manufactured by RIGAKU CORPORATION, trade name: RAD-IIA).

EXAMPLE

Example 1

In a 1-liter volume flask, 360 g of water was placed, and 90 g of titanium oxysulfate (manufactured by SOEKAWA CHEMICAL CO., LTD.) was added therein and mixed with each other while stirring, to obtain a solution. While cooling the solution with ice water, 410 g of an aqueous 25% ammonia solution (special grade; manufactured by Wako Pure Chemical Industries, Ltd.) was added dropwise thereto over 90 minutes, thereby precipitating a solid. The solid was separated by filtration, washed in hot water having a temperature of 60° C. ten times and dried at 70° C. to obtain a particulate titanium hydroxide.

The nitrogen content of the obtained dried titanium hydroxide was measured in a melting method using a nitrogen analyzer (manufactured by HORIBA LTD., tradename: EMGA-2800). As a result, it was found that the dried titanium hydroxide has a nitrogen content of 2.86% by weight in terms of nitrogen atom based on the dried titanium hydroxide. An X-ray photoelectron spectrum of the dried titanium hydroxide was measured using an apparatus of X-ray photoelectronic spectrophotometry (manufactured by RIGAKU CORPORATION, trade name: XPS-7000). As a result, it was found that the titanium hydroxide has a half-width $A_1$ of 1.84 eV, a half-width $B_1$ of 1.76 eV and an index $X_1$ of 0.96. Also, it was found that the titanium hydroxide has an amorphous phase.

The dried titanium hydroxide (100 parts by weight) was calcined in air at 400° C. for 1 hour to obtain a particulate titanium oxide (79.5 parts by weight). This weight change (from 100 parts by weight to 79.5 parts by weight) shows that the dried titanium hydroxide has a nitrogen content of 3.60% by weight in terms of nitrogen atom based on the titanium oxide. A crystal structure of the titanium oxide was found to be an anatase-type.

In a sealed-type glass reaction vessel made of Pyrex (diameter: 8 cm, height: 10 cm, volume: about 0.5 L), was placed a 5-cm diameter glass Petri dish on which 0.3 g of the titanium oxide (photocatalyst) obtained above was placed. The reaction vessel was filled with a mixed gas having a volume ratio of oxygen to nitrogen of 1/4 (i.e. oxygen:nitrogen=1:4), sealed with 4.5 μm of acetic acid and then irradiated with visible light from outside of the vessel. The irradiation was carried out using a 500 W xenon lamp as the light source (made by USHIO INC., trade name: Optical Modulex SX-UI500XQ, lamp: XL-500SX) equipped with an ultraviolet cutting filter (made by Toshiba Glass Co., Ltd., trade name: Y-45) cutting off ultraviolet light having a wavelength of about 430 nm or shorter and an infrared light cutting filter (made by USHIO INC., trade name: Supercold Filter) cutting off infrared light having a wavelength of about 830 nm or longer. When acetic acid is decomposed by visible light irradiation, carbon dioxide is generated. The concentration of generated carbon dioxide was measured with passage of time using a photoacoustic multi-gas monitor (type: 1312, made by INNOVA). With the generation rate of carbon dioxide, which was calculated by the change of carbon dioxide concentration, the photocatalytic activity of the obtained titanium oxide (photocatalyst) for acetic acid was evaluated. The generation rate of carbon dioxide was 6.28 μmol/h per gram of the titanium oxide (photocatalyst).

The above-obtained particulate titanium oxide is dispersed in water to prepare a photocatalytic coating agent. The photocatalytic coating agent is applied onto a stainless steel plate, followed by drying and heating at 400° C., to provide a stainless steel plate having a uniformly formed layer of titanium oxide on its surface.

Comparative Example 1

In a 300 ml volume flask, 26 g of titanium tetrachloride (special grade, manufactured by Wako Pure Chemical Industries, Ltd.) was placed and stirred in the nitrogen gas atmosphere. Then, 37 g of an aqueous 25% ammonia solution (special grade, manufactured by Wako Pure Chemical Industries, Ltd.) was added dropwise thereto over 5 minutes under cooling with ice, thereby precipitating a solid. The obtained solid was separated by filtration, washed in water having a temperature of 20° C. ten times and dried at 70° C. to obtain a titanium hydroxide.

The nitrogen content of the dried titanium hydroxide was measured in the same manner as in Example 1. As a result, it was found that the dried titanium hydroxide has a nitrogen content of 0.17% by weight in terms of nitrogen atom based on the dried titanium hydroxide. An X-ray photoelectron spectrum of the dried titanium hydroxide was measured using an apparatus of X-ray photoelectronic spectrophotometry (manufactured by RIGAKU CORPORATION, trade name: XPS-7000). As a result, it was found that the titanium hydroxide has a half-width $A_1$ of 2.10 eV, a half-width $B_1$ of 1.48 eV and an index $X_1$ of 0.70.

The dried titanium hydroxide (100 parts by weight) was calcined in air at 400° C. for 1 hour to obtain a titanium oxide (82.0 parts by weight). This weight change (from 100 parts by weight to 82.0 parts by weight) shows that the dried titanium hydroxide has a nitrogen content of 0.21% by weight in terms of nitrogen atom based on the titanium oxide. A crystal structure of the titanium oxide was found to be an anatase-type.

In the same manner as in Example 1, the photocatalytic activity of the titanium oxide (photocatalyst) for acetic acid was evaluated. The generation rate of carbon dioxide was 2.14 μmol/h per gram of the titanium oxide (photocatalyst).

What is claimed is:

1. A titanium hydroxide having a nitrogen content of 2.3% by weight or more in terms of nitrogen atom based on the titanium hydroxide and/or having a nitrogen content of about 3.3% by weight or more in terms of nitrogen atom based on the titanium oxide obtained after calcining the titanium hydroxide in air at about 400° C.

2. A titanium hydroxide according to claim 1, which has (i) an X-ray photoelectron spectrum which has a peak at a binding energy within the range of from 458 eV to 460 eV and (ii) an index $X_1$ calculated by the equation below of about 0.76 or more, $$X_1 = B_1/A_1$$

wherein $A_1$ and $B_1$ stand for respective half-widths of peaks, which are obtained by the process consisting of the steps of:

(1) measuring an X-ray photoelectron spectrum of the titanium hydroxide eight times while irradiating X-ray, (2) obtaining a half-width, $A_1$, of peak at a binding energy within the range of from 458 eV to 460 eV with respect to the integrated spectrum obtained by integrating the first and second X-ray photoelectron spectra, and (3) obtaining a half-width, $B_1$, of peak at a binding energy within the range of from 458 eV to 460 eV with respect to the integrated spectrum obtained by integrating the seventh and eighth X-ray photoelectron spectra.

3. A titanium hydroxide according to claim 1 or 2, which has an amorphous phase.

4. A process for producing a titanium hydroxide having a nitrogen content of 2.3% by weight or more in terms of nitrogen atom based on the titanium hydroxide and/or having a nitrogen content of about 3.3% by weight or more in terms of nitrogen atom based on the titanium oxide obtained after calcining the titanium hydroxide in air at about 400° C., which comprises the step of adding an ammonia solution or an ammonium compound into an aqueous solution of titanium compound.

5. A photocatalyst produced by calcining a titanium hydroxide according to claim 1 or 2.

6. A photocatalytic coating agent comprising a titanium hydroxide according to claim 1 or 2 and a solvent.

* * * * *